Sept. 27, 1927.
H. A. TRUSSELL
1,643,396
INTERNAL COMBUSTION ENGINE
Filed Aug. 22, 1921
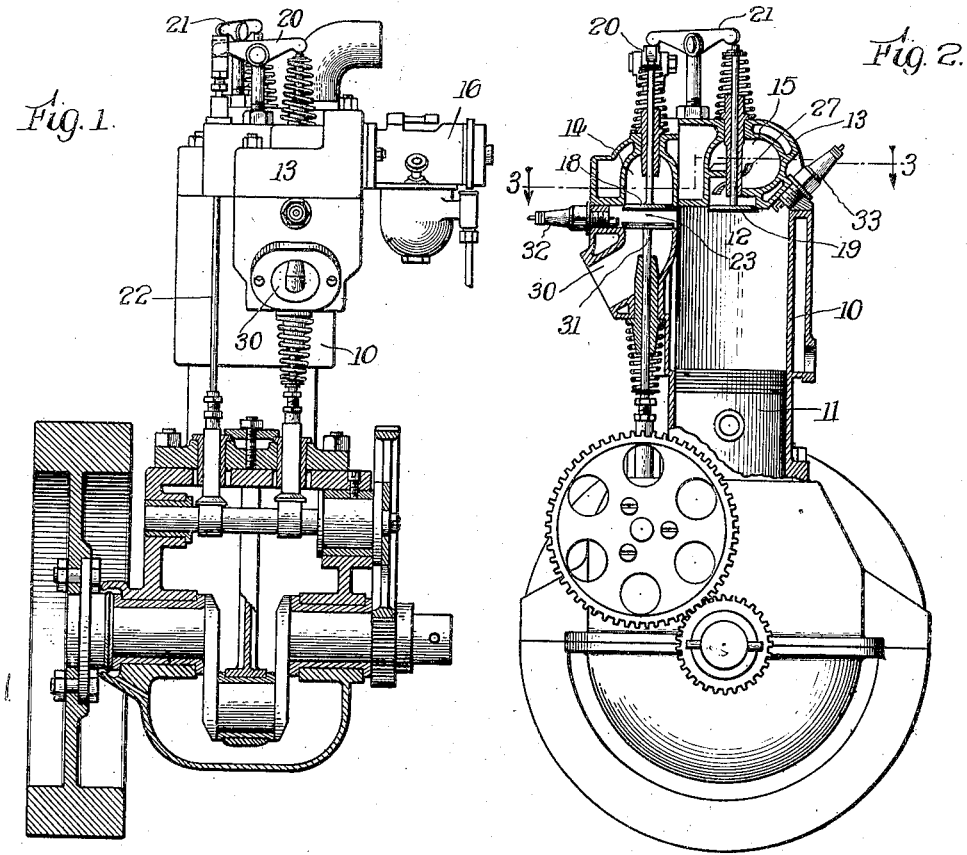
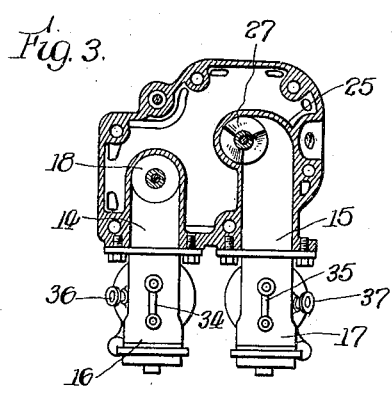
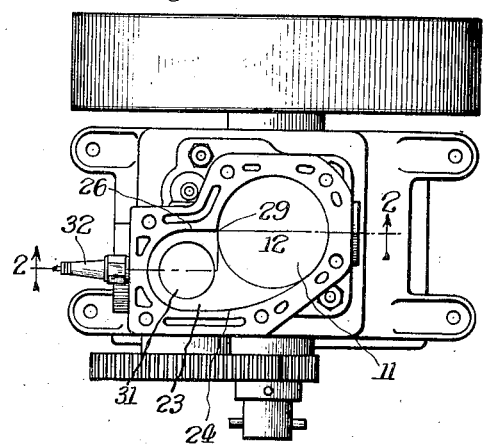

Patented Sept. 27, 1927.

1,643,396

UNITED STATES PATENT OFFICE.

HOMER A. TRUSSELL, OF CHICAGO, ILLINOIS.

INTERNAL-COMBUSTION ENGINE.

Application filed August 22, 1921. Serial No. 494,116.

The invention relates to internal combustion engines, and has among its various objects the provision of a construction whereby noises resulting from detonation or reverberation are practically eliminated which thereby increases the durability and adds to the operating qualities of the engine.

The invention has as a further object the provision of means for increasing the efficiency of an engine by proper vaporization and consumption of the fuel and also the provision of a means whereby different fuels or fluids may be employed either separately or in combination with each other.

It is also an object of the invention to construct the fluid passages so that the incoming fluid is introduced into the combustion chamber at a relatively high velocity and in addition to provide a means whereby this fluid and the residual exhaust gases are circulated while the former is being introduced into the combustion chambers of the engine, the direction or course of travel of the incoming and residual fluids being in the same general direction which thus prevents eddy currents of the fluids which results in their being properly stratified to accomplish the desired end.

It is a further object of the invention to provide a construction which turbulates or sets the fluid into a whirling motion during the intake stroke of the piston, this motion being maintained during the compression stroke and increased at the moment of ignition.

It is a further object of the invention to provide a construction which will cause the energy wave generated by combustion to assume a spiral formation, thereby permitting the combustion wave to attain a high velocity; hence inflammation will be expedited and maximum combustion pressures will be lower.

The invention also has as an object the provision of means whereby stratification of inflammable fluids and air and the isolation of residual incombustible fluids are obtained.

The invention also has as a further object the admission of an excess of air over that required for complete combustion during fractional loads, in a manner that will not cause the engine to be erratic in its action at various speeds and which will enable the engine to be operated at high speeds and deliver a big power output, thus providing relatively high compression and an excess of air during fractional loads which will facilitate flame propagation and cause complete combustion, without encountering excessively high compression when the engine torque is at its peak.

It is also an object of the invention to provide a means whereby ignition will occur in a rich rapidly burning mixture which will burn out into supporting air which has been provided to increase compression and assure complete combustion; or which will burn out into a lean mixture, the heat and pressure created by the combustion of the rich portion being sufficiently high to permit the ignition of the lean mixture which would otherwise be too lean to support combustion.

It is a further object of the invention to provide means for regulating the period of time required for inflammation and combustion of the combustible fluid contained within the engine cylinder to meet different power requirements at various engine speeds.

In addition to the above it is an object of the invention to facilitate vaporization of the fuel and assist in its consumption by directing the incoming fluids while agitated so that the contact with a relatively hot portion of the interior of the combustion chamber and also with the residual fluid in the cylinder which is relatively hotter than the incoming vapor, but without diffusing the inflammable fluid with the residual fluid prior to inflammation of combustible fluid.

The particular structure employed for accomplishing these and other objects includes an arrangement whereby each combustion chamber may receive its charge from a plurality of carbureters from which like or unlike fluids may be introduced into the combustion chambers either separately or in combination with each other. Both carbureters may feed the same fuel or one may feed a fuel of different character from that of the other. In either case both may be supplying a mixture which will provide for the maximum power, either one may be supplying an inflammable mixture and the other admitting air, or either one may supply a rich mixture and the other supply a lean mixture.

The passages leading from these carbureters to the combustion chambers are relatively small in diameter which cause the fluid to be introduced into the combustion chambers at a relatively high velocity. The surface area with which the fuel contacts while passing through these relatively small passages is greater than that of a single passage capable of permitting the passage of an equal volume of fluid and therefore better vaporization is accomplished and fluid volume is maintained. By employing these relatively small fluid passages high fluid velocity is maintained during fractional loads without sacrificing the volumetric efficiency at high engine speeds. This arrangement is also advantageous because the turbulence created by the incoming fluid is directly proportionate to the incoming fluid velocity. These fluid passages from the carbureters to the combustion chambers are provided with means for whirling the fluid as it is passed through the passages and introduced into the combustion chambers. These passages are designed so that upon the introduction of the fluid into the combustion chambers through either passage said fluid is caused to be agitated or moved in the same general direction to that fluid introduced through the other passage.

In the present structure one fluid passage is arranged so that it will deliver fluid into the combustion chamber within the circumference of the piston. This passage is designed to cause the fluid to be agitated or whirled during its passage therethrough and upon its introduction into the combustion chamber. This passage is arranged so that a portion of it is offset with relation to another portion adjacent the valve, and is provided with helical webs which are preferably arranged at the valve end of the passage. The offset portion and the helical webs cooperate to set the fluid into a whirling motion as it travels through this passage and enters the combustion chamber.

The other fluid passage is arranged so that it will deliver fluid into the main combustion chamber through a passage which might be termed an auxiliary combustion chamber and which is offset with relation to the axis of the main combustion chamber. This offset passage or auxiliary combustion chamber will be hereinafter referred to as the pocket and the term combustion chamber will be used to designate the main combustion chamber. Fluid entering the pocket from the fluid passage leading to the pocket will displace residual fluid or the unscavenged portion of the product of the previous combustion, from the pocket into the combustion chamber; a part of the new charge follows the displaced residual fluid into the combustion chamber provided the new charge is of sufficient volume; fluids entering the combustion chamber from the pocket are set into a whirling motion in the same direction as that assumed by the fluid entering the combustion chamber from the fluid passage which has its outlet orifice arranged to deliver fluid directly to the combustion chamber. Due to the relatively different weights of said fluids and the whirling action of the incoming fluid, which is the heavier, the latter will spin itself around the residual fluid and contact with it on one side and the hot walls of the combustion chamber on the other side which heats this new charge and expedites vaporization.

Hot residual fluid will be at the core of the whirling fluid, unvaporized fuel or fluids heavy because of low temperature or an excess of vapor will be on the outside of the whirling mass, hence isolation of the residual fluid and stratification of the air and the inflammable fluids are obtained and diffusion of the inflammable fluids and the incombustible residual fluids is obivated.

The pocket is further designed so that upon the compression stroke of the piston a part of the fluid is directed toward the pocket in the same general direction of rotation to that in which it was introduced into the combustion chamber.

This pocket and the combustion chamber are each provided with a spark plug which ignites the fluid in the pocket and the combustion chamber simultaneously, and as the pocket is constructed to direct the fluid emerging therefrom toward the combustion chamber in a manner that will accelerate the whirling motion of the combustion chamber fluid contents, the turbulence or whirling motion is increased at the moment of ignition, thereby expediting flame propagation and facilitating combustion.

The adjustments and controls of the carburetors are such that a rich rapidly burning mixture can be supplied in the pocket while the combustion chamber is being charged with air or a lean inflammable mixture. When the air charge in the combustion chamber is employed with a rich mixture in the pocket the air charge serves to bolster up compression and furnish the oxygen necessary for the complete combustion of the fuel. When the lean mixture in the combustion chamber is employed with the rich mixture in the pocket the lean mixture serves to bolster up compression and furnish the oxygen necessary for the complete combustion of the rich mixture, the heat and pressure created by the combustion of the rich mixture will be sufficient to cause the lean mixture to be ignited and all of the fuel to be consumed, whereas the lean mixture would otherwise be too lean to support combustion. The rich mixture is employed in this manner to insure steady and efficient operation during fractional loads and is delivered to the hot pocket for thorough vaporization and to prevent its diffusion with the other fluids contained in the combustion chamber until after the rich portion is inflamed. The pocket also contains an exhaust valve which controls the passage through which the products of combustion are scavenged. Due to the relative shape and position of the pocket and the combustion chamber there are no directly opposed areas which will sufficiently impede the energy wave generated by combustion to cause reverberation and the energy wave is caused to assume a spiral formation at a very high velocity; hence inflammation is very rapid, combustible fluids are not entrapped and not caused to spontaneously explode or disassociate, reverberation is obviated and consequently detonation is mitigated, longevity and fuel efficiency of the engine are increased and cooling is facilitated.

The speed and power output of the engine and the period of time required for inflammation and combustion of the inflammable contents of the combustion chamber and the pocket are governable by the construction of the engine and by the various controls of the carburetors. A rapidly burning, powerful charge, one that will quickly generate high pressure can be secured by employing fluids of rich mixture strength in both the combustion chamber and the pocket; a powerful moderately rapidly burning charge, one that will generate high pressure quickly enough for moderate engine speed, can be secured by employing fluid of rich mixture strength in either the combustion chamber or the pocket and fluid of lean mixture strength in the other; a rapidly burning moderately powerful charge, one that will quickly generate moderately high pressure, can be secured by employing fluid of rich mixture strength in either the combustion chamber or the pocket and fluid devoid of fuel in the other.

The invention will be explained in conjunction with the accompanying drawings which show one embodiment thereof, it being obvious that changes and modifications may be resorted to without departing from the spirit of the invention as expressed in the appended claims forming a part hereof.

In the drawings Fig. 1 is a side elevation of an engine partially in section and constructed according to the invention;

Fig. 2 is a transverse section partially in elevation taken on line 2—2 of Fig. 4;

Fig. 3 is a horizontal section of the removable cylinder head taken on line 3—3 of Fig. 2; and Fig. 4 is a top plan view of the engine shown in Figs. 1 and 2 with the cylinder head removed.

The invention is shown as applied to a single cylinder motor, it being understood, however, that it is not limited to this particular type of engine as it is obvious that the invention is applicable to motors employing a multiplicity of cylinders. The principles employed in both being identical an explanation of an engine of the single cylinder type will suffice for an understanding of all.

In the particular construction illustrated in the drawings, the invention is applied to the cylinder head of the engine, the top of the combustion chamber is also slightly modified, the precise arrangement, however, need not be adhered to as it is obvious that the invention is capable of being performed by various other structures which will cause a similar action of the fluids or fuels to be accomplished. The structure illustrated includes the engine cylinder 10, the piston 11 and a combustion chamber 12 which is closed at its uppermost end by the removable cylinder head 13. This cylinder head is provided with two fluid intake passages, generally designated 14 and 15, and each of these passages connects with individual carbureters 16 and 17 from which the combustion chamber 12 is fed. These carbureters may feed similar, different or a combination of fluids to the combustion chamber, depending upon circumstances or desires. Each of these passages 14 and 15 is controlled by a valve such as 18 and 19, which are actuated in synchronism to open and close the passages 14 and 15. These valves are operated by means of the rocker arms 20 and 21, and the push rod 22, which engages and actuates the rocker arm 20. The motion is transmitted to the other rocker arm 21 by the adjustable end of the push rod 22, said end being recessed to permit the engagement of an end of the rocker arm 20 by the push rod 22. The passages 14 and 15 leading from the respective carbureters 16 and 17 are of a relatively small diameter which increases the velocity of the fluid as it passes therethrough and into the combustion chamber and also augments the vaporization of the fuel so that better combustion thereof results.

The passage 14 communicates with a pocket 23 provided adjacent the uppermost end of the combustion chamber 12, and the inlet to this pocket is controlled by the valve 18 which is arranged between the inlet and the pocket. This pocket is designed to set the fluid in a whirling motion as the fluid travels through this pocket and flows towards the combustion chamber. This pocket is clearly shown in Fig. 4. By referring to this figure it will be evident that fluid entering the pocket through the passage 14 at a relatively high velocity will contact with the walls thereof and be directed toward the wall 24 which directs the fluid towards the combustion chamber and causes it to be whirled in a contra-clockwise direction within said chamber. Thus it is evident that fluid passing through the passage 14 from the carbureter 16 enters the pocket 23 at a high velocity and also as said fluid enters the combustion chamber it will be set into a whirling motion, which motion will be continued throughout the travel of the fluid from the pocket into the combustion chamber and during its confinement in said chamber while the engine is in operation. The passage 15 is also curved at 25 to cause this whirling action to be imparted to the fluid prior to its passage therefrom into the combustion chamber. In addition to this curved portion this passage is provided with a plurality of webs 27 which are arranged adjacent the termination of the passage. These webs are of a helical formation and cause the fluid to be whirled in the same general direction to that introduced into the combustion chamber through the passage 14 and pocket 23; thus eddy currents in the fluid are prevented. The termination of this last named passage 15 is arranged so that the incoming fluid from this passage will be admitted into the combustion chamber directly above the piston and thus this fluid will mingle with that entering the combustion chamber through the passage 14. The velocity with which the fluid travels through and is emitted from these passages into the combustion chamber, the curved walls 24, 25, the straight wall 26, the helical webs 27 of the respective passages 14 and 15 cooperate to set the fluid into a whirl as it enters the combustion chamber. This turbulence assists in thoroughly vaporizing the fluid, properly stratifying it and permits of its being subsequently rapidly inflamed, which adds to the efficiency with which the motor may be operated, as substantially all of the combustible particles of the fluid will be properly consumed. This agitation or whirling action of the fluid is maintained during the compression stroke of the piston 11. This is aided in accomplishment by means of the structure of the pocket 23 and particularly the curved wall 24, as it is evident that upon the compression stroke of the piston the fluid within the combustion chamber 12 will be compressed and a portion thereof will enter the pocket 23. Part of the fluid whirling in the combustion chamber and particularly that fluid which engages the curved wall 24 adjacent the pocket will be compressed toward and into the pocket in a clockwise direction, or in a correlative direction to the whirling action of the fluid in the combustion chamber. Whirling fluid compressed into the pocket 23 from the combustion chamber 12 adjacent the junction 29 of the curved wall 24 and the straight wall 26 will converge with part of the fluid in the pocket 23 and continue on to the portion of the curved wall 24 adjacent the junction of combustion chamber and pocket, the fluid upon contacting with this portion of the curved wall 24 will be directed to revolve in the pocket 23 and to continue to revolve in the combustion chamber 12, the amount of the fluid which will enter the pocket being governed by the relative heat and volumetric capacity of combustion chamber and pocket.

An exhaust port 30 is provided to communicate with the pocket 23 and this port is controlled by the exhaust valve 31 which is properly timed to open near the end of the power stroke and close near the start of the intake stroke. A spark plug 32 is arranged to ignite the fluid within the pocket 23 and a spark plug 33 is provided to ignite the fluid in the combustion chamber 12.

A means (not shown) is provided for causing the spark of one of these plugs to be created simultaneously with that of the other, so that the fluid in both the pocket 23 and that within the combustion chamber 12 will be simultaneously ignited, which also adds to the efficiency of the operation of the engine. This simultaneous ignition of the fluid in both the pocket and combustion chamber causes the burning of one to spread or expand towards the other which consumes practically all of the combustible material in the charge. The inflammation and pressure rise of the pocket contents would be more rapid than that of the combustion chamber because of the greater heat of the pocket, the absence of residual gases in the fluid contained therein, the relatively small distance flame is obliged to travel from the plug, the relatively small capacity of the pocket and also because the fluid which has been compressed into the pocket from the combustion chamber during the compression stroke was the richest portion thereof, inasmuch as it was that portion which was the heavier and in close contact with the combustion chamber walls. This results even though the inflammable fluids admitted to the combustion chamber and to the pocket were of the same character and mixture strength.

This rapid combustion of the pocket fluid contents causes it to be violently ejected therefrom and to enter the combustion chamber increasing the whirling motion existing therein immediately following ignition, the rapid increase of turbulence, flame and pressure serving to inflame and facilitate combustion of all of the combustible fluid contained in the combustion chamber.

The speed and power output of the engine and the period of time required for inflammation and combustion of the inflammable contents of the combustion chamber 12 and the pocket 23 is governable by the throttle controls 34 and 35 and the fuel controls 36 and 37 of carbureters 16 and 17, respectively. The throttle controls 34 and 35 regulate the volume of fluids admitted to the pocket 23, and the combustion chamber 12 from the carbureters 16 and 17, respectively. The fuel controls 36 and 37 regulate the mixture strength or shut off the fuel supply of the fluids admitted to the pocket and the combustion chamber, respectively.

The operation of the engine is substantially the same when air only is admitted through passage 14 and inflammable fluid is admitted through the passage 15, until the moment of ignition when the energy wave is toward the pocket but not directly into it. By this arrangement the inflammable fluid is not entrapped and not detonated therein because the air entering the combustion chamber through the pocket has reduced the temperature of the pocket and also the temperature of the exhaust valve and spark plug contained therein and the air remaining in the pocket has the effect of obliterating the pocket by its ability to absorb heat and cushion the pressure wave. Upon this action the piston is driven downwardly and upon the exhaust stroke, the exhaust valve 31 is opened, permitting the products of combustion to be scavenged from the combustion chamber through the pocket 23. Upon the succeeding operation of the valves 18 and 19 to admit a charge of fluid into the pocket 23 and the combustion chamber 12 residual fluid in the pocket is driven into the combustion chamber by the fluid entering the pocket.

The fluid entering the combustion chamber 12 through the passage 15 will spin itself into a mantle around the combustion chamber fluid contents which are of lesser weight and greater heat. Thus the fluid heavy because of low temperature of the presence of fuel vapor will be on the outside of the whirling mass and will contact with the relatively hot cylinder walls on one side and the residual fluid on the other.

The contact of the new charge with the relatively hot walls of the combustion chamber and the relatively hot portion of the previous charge causes the new charge to be quickly and thoroughly vaporized which materially adds to the efficiency with which the engine may be operated. The invention is shown as applied to a four cycle engine.

The inlet valves 18 and 19 are mechanically opened when the piston 11 is near top center, remaining open during the first stroke of the piston; fuel from the carburetors 16 and 17 is admitted past the valves 18 and 19 to the pocket 23 and to the combustion chamber 12 respectively, until the piston passes bottom center, then these valves are permitted to close; the fuel charge is circulated above the piston in a manner heretofore described, the gases moving in a manner which will facilitate vaporization, and prevent isolation of any portion of the inflammable charge; this circulation being also aided during compression, or second stroke of the piston, by the rapid increase of pressure in the pocket, this pocket will be relatively hotter than the combustion chamber, therefore, the gas in the pocket will expand more rapidly and will be ejected into the combustion chamber.

The compressed fuel is ignited near the beginning of the third stroke, high tension electric current being supplied to the spark plugs 32 and 33 simultaneously, or nearly so. A single ignition plug in or adjacent the pocket may be used and a similar action of the gas will still result.

At the moment of ignition the flame emerging from the pocket forces the fluid within the combustion chamber to circulate more rapidly in the continuous unobstructed path provided by the contour of this chamber, the unignited portion being carried ahead of the combustion wave, and this unignited portion is driven into contact with the inclosed portion adjacent the junction of the pocket and the combustion chamber.

It would be advantageous to restrict the aperture between the pocket 23 and the combustion chamber 12 to increase the velocity of the combustion wave, especially in a slow speed engine.

As the combustion pressure increases the piston is forced out on the third stroke; near the end of this stroke the exhaust valve 31 is mechanically opened and held open throughout the fourth stroke, being permitted to close near the end of this stroke.

Maximum power and flexibility are obtained with each carburetor adjusted to deliver a mixture sufficiently rich to produce the most powerful combustion impulse.

Maximum fuel efficiency is obtained with the carburetor supplying the pocket adjusted to deliver a mixture sufficiently rich to produce the most powerful combustion impulse, and the carburetor supplying the combustion chamber adjusted to deliver a mixture sufficiently lean to produce the most economical mixture.

Fuels of different volatility may be used in the respective carburetors; the fuel of lower volatility preferably fed to the pocket, primarily because of the greater heat encountered in this pocket. In which case it is desirable to supply minimum throttle requirements from the combustion chamber carburetor; moderate torque requirements from the pocket carburetor, and maximum throttle requirements from both carburetors.

If the engine be designed for higher compression than is permissible if maximum power is desired for a given piston displacement, governed principally by the character of the fuels to be used—pinking, or detonation may occur while the engine is developing high torque. This pinking can be overcome by increasing the proportion of the fuel fed by the carburetor supplying the more volatile or the leaner mixture.

Varying the proportionate volumes of rich mixture and lean mixtures or of mixtures formed from fuels of different volatility supplied by the respective carburetors provides a means of regulating the period of time required for inflammation and combustion independent of ignition timing.

Increasing the proportion of lean mixture enough to eliminate pinking will not decrease the power output—even though this will reduce the fuel consumption—because pinking always results in a loss in power output and a loss in fuel efficiency.

In the conventional engine, detonation tendencies increase with subsequent impulses. An impulse accompanied by incipient detonation is generally followed by one accompanied by more noticeable detonation, conditions of service remaining the same. Pronounced detonation may occur under conditions exactly similar to those existing during several previous impulses which were accompanied by little or no unusual noise. The detonation tendency during a single combustion impulse is somewhat similar. The combustion pressure does not gradually reach a maximum and recede to that which exists at the moment of exhaust valve opening, but the combustion pressure attains several peaks with intervening periods of comparatively low pressure. Detonation is liable to occur after several of these peaks have passed unaccompanied by any noticeable indications of detonation.

My combustion chamber and pocket serve also to obviate the building up of detonation producing conditions. Each of these peaks will be concurrent with additional blasts from the pocket, and uniformity of turbulence, heat distribution and flame propagation and combustion results throughout similar operating conditions.

From the foregoing description it is evident that the fluid entering the combustion chamber through the passage 15 will be set into a whirling motion by the offset or curved portion 25 and the helical webs 27. It is further evident that fluid entering the combustion chamber through the pocket 23 and the passage 14 is set into a whirling motion in the same general direction to that fluid entering the combustion chamber through the passage 15, which eliminates eddy currents in the fluid within the cylinder and assists in maintaining turbulence throughout the compression stroke. In addition, it is obvious that thorough vaporization of the fuel is assured, flame is rapidly propagated and detonation is eliminated as the structure is devoid of any portion which could entrap inflammable fluid or any surfaces with which the fluid may contact to cause reverberation.

It is further evident that by employing a construction such as herein shown and described, relatively heavy fuels may be employed to advantage, furthermore, fluids of various characters may be also utilized, and these may be combined with each other or consumed separately, depending upon various conditions.

It is also evident that the fuel of rich mixture strength is first to be inflamed and that inflammation of the fuel of lean mixture strength follows as rapidly as the increase of flame, heat and pressure will permit, and that the period of time required for inflammation and combustion of the entire inflammable contents of the combustion chamber and pocket is governable by the various controls of the carburetors. Hence high mean effective pressures may be maintained without encountering excessively high maximum pressure. It is further evident that the incombustible residual fluid is not diffused with the inflammable fluid prior to inflammation of the latter, which expedites inflammation and facilitates combustion, inasmuch as incombustible residual fluid when mixed with combustible fluid has a pronounced effect of retarding inflammation and combustion which naturally detracts from the efficiency with which the inflammable fluid could be consumed.

It is also evident that by employing fuel passages which are relatively small in diameter, high fluid velocity is maintained during fractional loads without sacrificing fluid volume at high engine speeds. This is of advantage in creating the desired turbulence, as the turbulence created by the incoming fluids is directly proportionate to the incoming fluid velocity, as it is evident that the fluid velocity through small manifolds is greater than that of large manifolds.

This is of further advantage because high velocity of the incoming fluid augments stratification of the combustion chamber fluid contents, aids in the isolation of incombustible residual fluid, and rapidly spreads flame throughout the combustion chamber.

It is also evident that the structure creates and maintains the desired turbulence during both the intake and compression stroke of the piston and that this turbulence is accelerated at the moment of ignition in the same general direction of rotation and that the energy wave created by combustion is directed in a spiral formation so that it may attain high velocity, rapidly spread flame and not entrap inflammable fluids which would cause them to spontaneously explode, dissociate or burn too late for efficiency.

It is further evident that the increased air admitted to the combustion chamber over that required for complete combustion, has served to increase incoming fluid velocity and turbulence, promote stratification, dissipate heat, furnish an abundance of oxygen and increase compression, thereby expediting flame propagation and facilitating combustion.

Having thus described the invention, what I claim and desire to cover by Letters Patent is:

1. In an internal combustion engine, the combination of a combustion chamber, a plurality of fluid inlets leading to the combustion chamber, one of said inlets having means for causing fluid to be set in a whirling motion circumferentially of the combustion chamber prior and subsequently to its being introduced into the combustion chamber.

2. In an internal combustion engine, the combination of a combustion chamber, a plurality of fluid inlets leading to the combustion chamber, said inlets having means for causing fluid to be set into whirling motion circumferentially of the combustion chamber and in the same direction when it is introduced into the combustion chamber, one of said inlets having means for setting the fluid in a whirling motion prior to its introduction to said combustion chamber.

3. In an internal combustion engine, the combination of a combustion chamber, a fluid inlet leading to the combustion chamber, said inlet having helical webs for causing fluid to be set in a whirling motion and introduced into said combustion chamber while in said motion.

4. In an internal combustion engine, the combination of a combustion chamber, a plurality of fluid inlets leading to the combustion chamber, said inlets having means for causing fluid to be set in a whirling motion around the circumference of the chamber as it is introduced into the combustion chamber, and separate means for each passage for igniting the fluid of each passage.

5. In an internal combustion engine, the combination of a combustion chamber, a plurality of fluid inlets leading to the combustion chamber, said inlets having means for causing fluid to be set into whirling motion circumferentially of the chamber as it is introduced into the combustion chamber, one of said inlets being arranged at one side of the combustion chamber.

6. In an internal combustion engine, the combination of a combustion chamber, a plurality of fluid inlets leading to the combustion chamber, said inlets having means for causing fluid to be set into whirling motion circumferentially of the chamber as it is introduced into the combustion chamber, one of said inlets being arranged at one side of the combustion chamber, the other being arranged adjacent the uppermost end of the combustion chamber.

7. In an internal combustion engine, the combination of a combustion chamber, a plurality of fluid inlets leading to the combustion chamber, said inlets having means for causing fluid to be set into whirling motion as it is introduced into the combustion chamber, one of said inlets being arranged adjacent the uppermost end of the combustion chamber.

8. In an internal combustion engine, the combination of a combustion chamber, a fluid passage leading to the combustion chamber, said passage having means for causing fluid to be set in a whirling motion circumferentially of the combustion chamber as it enters said combustion chamber, and means arranged in said passage for causing the fluid in said passage to be ignited.

9. In an internal combustion engine, the combination of a combustion chamber, an offset fluid passage leading to the combustion chamber, said offset passage having means for introducing fluid in a whirling motion to the combustion chamber, and means arranged in said offset passage for igniting said fluid.

10. In an internal combustion engine, the combination of a combustion chamber, a plurality of passages leading to said chamber, means whereby different fluids may be fed to said passages and said passages being constructed to turbulate said fluids while passing through said passages and to introduce the fluids into said chamber circumferentially of the combustion chamber.

11. In an internal combustion engine, the combination of a combustion chamber, a plurality of passages leading to said chamber, means whereby different fuels may be fed to said passages and said passages being constructed to turbulate and introduce the fluids into said chamber, one of said passages being offset and means for igniting the fluid arranged in said offset.

12. In an internal combustion engine, the combination of a combustion chamber, a combustion chamber pocket arranged adjacent and inward relatively to an end of the combustion chamber and being offset with relation to the axis of said combustion chamber, means for supplying fuel to said pocket, means for directing the fuel emerging from said pocket with a whirling motion around the axis of the combustion chamber as it is introduced from the pocket into the combustion chamber, said last mentioned means including the walls of said offset pocket and the walls of the combustion chamber.

13. In an internal combustion engine, the combination of a combustion chamber, a combustion chamber pocket offset with relation to the axis of said combustion chamber, means for supplying fuel to said pocket, means including the walls of both said combustion chamber and said offset pocket provided to direct the fuel emerging from said pocket in whirling motion onto the combustion chamber wall, means including said offset pocket and said second mentioned means causing fuel to circulate around the axis of the combustion chamber as the fuel is transferred from said pocket to said combustion chamber.

14. In an internal combustion engine, the combination of a combustion chamber, a combustion chamber pocket communicating with the combustion chamber, an exhaust valve controlling the exhaust from said pocket, means connected with the combustion chamber for supplying an inflammable fluid to said pocket, means for supplying a slowly burning mixture to said combustion chamber, and means provided in said pocket for igniting the fluid in said pocket.

15. In an internal combustion engine, the combination of a cylinder having a combustion chamber, a piston operable therein, means providing for the admission of fluid to said combustion chamber, means for directing the incoming fluid in a whirling motion transverse to the axis of the combustion chamber and into contact with the combustion chamber walls within the circumference of the cylinder bore.

16. In an internal combustion engine, the combination of a combustion chamber, means providing for the admission of fluid to said combustion chamber, means for causing the incoming fluid to be whirled and spun around the axis of the combustion chamber fluid contents and means for igniting the fluid and causing said ignited fluid to be whirled in the same direction as the fluid contained in said chamber.

17. In an internal combustion engine, the combination of a combustion chamber, a combustion chamber pocket, said pocket being offset so that fluid upon entry and ignition will be directed from the pocket to one side of the combustion chamber and caused to circulate around the axis of said combustion chamber.

18. In an internal combustion engine, the combination of a combustion chamber, a combustion chamber pocket, means for supplying fluid to the pocket, and means permitting fuel to be transferred from said pocket to said combustion chamber at one side of the center of said combustion chamber, so that said fuel upon entering said combustion chamber will progress in a circular direction.

19. In an internal combustion engine, the combination of a combustion chamber, a combustion chamber pocket, means for supplying fluid to said combustion chamber within the circumference of the cylinder bore with a whirling motion, means for supplying fluid to said pocket, means permitting fluid to be transferred from said pocket to said combustion chamber with a whirling motion in the same direction of rotation as that assumed by the fluid supplied to the combustion chamber by the first mentioned means.

20. In an internal combustion engine, the combination of a combustion chamber, a combustion chamber pocket, means causing fluid to be introduced in whirling motion to said combustion chamber so that incoming fluid will circulate between the fluid at the center of said combustion chamber and the combustion chamber wall, said means including the walls of said pocket one of which is shaped to direct fluid in substantially a straight line toward said combustion chamber at one side of the center of said combustion chamber, and another wall being shaped to direct fluid in an arc toward the combustion chamber wall on the same side of said center of said combustion chamber.

21. In an internal combustion engine, the combination of a combustion chamber, a combustion chamber pocket, means for permitting the engine to scavenge provided in said pocket and means also provided in said pocket through which air may enter the combustion chamber through said pocket, means for admitting inflammable fluids into said combustion chamber and means for igniting the fluid in said combustion chamber.

22. In an internal combustion engine the combination of a combustion chamber, a plurality of inlet passages through which said combustion chamber may receive fluid charges through openings provided in transverse portions of said combustion chamber for introducing fluid from either passage in a whirling motion in the same direction of rotation to said combustion chamber, said engine being operable with the fuel introduced to the combustion chamber through either one and both of said inlet passages.

23. In an internal combustion engine, the combination of a combustion chamber, an inlet passage through which the combustion chamber may receive a fluid charge, said inlet passage having means including an offset portion which contains helical webs for introducing the fluid in a whirling motion to said combustion chamber.

24. In an internal combustion engine, the combination of a combustion chamber, a piston, means providing for the combustion of fluid in the combustion chamber, and means causing the energy wave generated by said combustion to circulate around the axis of the combustion chamber and to expand on to the piston in a spiral formation said last mentioned means including a combustion chamber pocket in which said fluid is ignited.

25. In an internal combustion engine, the combination of a combustion chamber, a combustion chamber pocket, a fluid inlet leading to said pocket, said pocket being offset with relation to the center of the combustion chamber, means provided adjacent said pocket to direct fluid emerging therefrom in a circular direction, said means and said pocket cooperating to set the fluid into a whirling motion as it leaves said pocket and enters said combustion chamber and means for ignition provided adjacent said means for directing said fluid.

26. In an internal combustion engine, the combination of a combustion chamber, a combustion chamber pocket, means including a fluid inlet passage opening into within the circumference of the cylinder bore for supplying fluid in whirling motion to said combustion chamber, means including another fluid inlet passage for supplying fluid to said pocket, and means permitting fluid to be transferred from said pocket to said combustion chamber with a whirling motion in the same direction of rotation as that assumed by the fluid supplied to said combustion chamber by the first mentioned means.

27. In an internal combustion engine, the combination of a combustion chamber, a combustion chamber pocket, means permitting fluid to be transferred during the intake cycle from said pocket to said combustion chamber at one side of the center of said combustion chamber so that fluid will circulate around the center of said combustion chamber, means permitting fluid to be transferred from the combustion chamber to the pocket during the compression cycle with a whirling motion correlative to the circulation of fluid in the combustion chamber, and means including the first and second mentioned means for directing the energy wave generated by combustion of the fluid in said pocket during the inpulse cycle with a whirling motion from said pocket into said combustion chamber in the same direction of rotation as that which existed in the combustion chamber during intake and compression cycles.

28. In an internal combustion engine, the combination of a combustion chamber, a combustion chamber pocket, means for supplying fluid to said pocket, means provided in said pocket for igniting fluid in said pocket, means permitting fluid to be transferred from said pocket to said combustion chamber at one side of the axis of said combustion chamber, said last mentioned means causing the fluid upon emerging from said pocket during intake cycle to enter said combustion chamber with a whirling motion and to circulate around the axis of said combustion chamber, said last mentioned means also causing the fluid upon being ignited in and expelled from said pocket during impulse cycle to enter said combustion chamber in the same direction as and to accelerate the whirling motion created in said combustion chamber during the intake cycle.

29. In an internal combustion engine, the combination of a combustion chamber, a combustion chamber pocket, said combustion chamber being offset with relation to said pocket, means arranged at substantially the axis of the combustion chamber for providing said combustion chamber with fluid in whirling motion, and means whereby said pocket may receive fluid from said combustion chamber in whirling motion correlative to the whirling motion of fluid contained in said combustion chamber.

30. In an internal combustion engine, the combination of a combustion chamber, a combustion chamber pocket, said combustion chamber being offset with relation to said pocket, means for providing said combustion chamber with fluid in whirling motion, and for providing said pocket with fluid in whirling motion associated with the whirling motion of the fluid in said combustion chamber, means provided to ignite the fluid in said pocket, and means for directing the energy wave generated by the combustion of the fluid in said pocket into the combustion chamber so that the whirling motion of the combustion chamber fluid contents will be accelerated in the same direction of rotation.

31. In an internal combustion engine, the combination of a combustion chamber, a combustion chamber pocket, a fluid inlet passage leading to said pocket, said passage and said pocket cooperating to form a fluid inlet to said combustion chamber, means for introducing fluid in whirling motion to said combustion chamber, said means causing fluid to circulate around the fluid at the center of said combustion chamber, said means including the walls of both said pocket and said combustion chamber, one side wall of said pocket directing the fluid to one side of center of said combustion chamber, another side wall of said pocket directing the fluid to contact with the combustion chamber wall on the same side of said center of said combustion chamber.

32. In an internal combustion engine, the combination of a combustion chamber, means for introducing fluid to said combustion chamber, means causing the incoming fluid to move in a circular direction between the fluid remaining of the previous charge and the combustion chamber wall, said last mentioned means including said first mentioned means.

33. In an internal combustion engine, the combination of a combustion chamber, means for introducing fluid to said combustion chamber, said means including a passage leading to said combustion chamber, said passage directing fluid in a curved path on to the circular wall of said combustion chamber when the fluid is transferred from the passage to the combustion chamber, means for introducing fluid in whirling motion to said combustion chamber, said first mentioned means and said last mentioned means cooperating to spin the incoming fluid around the core of the fluid contents of said combustion chamber.

34. In an internal combustion engine, the combination of a combustion chamber, means for introducing fluid in whirling motion to said combustion chamber, said means including a passage leading to said combustion chamber, said passage being constructed to direct fluid in a curved path on to the circular wall of said combustion chamber.

35. In an internal combustion engine, the combination of a combustion chamber, means providing for the combustion of fluid in said combustion chamber, and means causing the energy wave generated by said combustion to be directed into circular motion, said last mentioned means including a curved wall which is a continuation of the circular wall of said combustion chamber, said curved wall forming part of a pocket containing means for igniting fluid.

36. In an internal combustion engine the combination of a combustion chamber, means located axially of the combustion chamber for introducing a combustible fluid into the combustion chamber, means for igniting said fluid, and means including a combustion chamber pocket for directing the ignited fluid in a whirling motion into the interior of the combustion chamber and around the axis of the combustion chamber.

37. In an internal combustion engine, the combination of a combustion chamber having a tangentially disposed combustion chamber pocket provided with means for causing ignition.

38. In an internal combustion engine, the combination of a combustion chamber and a tangentially disposed combustion chamber pocket provided with an inlet valve and means for causing ignition.

39. In an internal combustion engine, the combination of a combustion chamber and a tangentially disposed combustion chamber pocket provided with an exhaust valve and means for causing ignition.

40. In an internal combustion engine the combination of a combustion chamber and a tangentially disposed combustion chamber pocket provided with an inlet valve and an exhaust valve.

41. In an internal combustion engine, the combination of a combustion chamber and a tangentially disposed combustion chamber pocket provided with an inlet valve, an exhaust valve and means for causing ignition.

42. In an internal combustion engine, the combination of a combustion chamber and a combination chamber pocket provided with an exhaust valve and means for causing ignition, means for delivering fluid to the combustion chamber without passing said fluid through said pocket, and means for causing ignition in said combustion chamber.

43. In an internal combustion engine, the combination of a combustion chamber, a combustion chamber pocket, means provided in said pocket to permit the engine to scavenge, means provided in said pocket to permit air to enter said combustion chamber through said pocket, means provided to admit inflammable fluid into said combustion chamber, and means for igniting the fluid in said pocket.

44. In an internal combustion engine, the combination of a combustion chamber pocket provided with an inlet valve, an exhaust valve and means for causing ignition, means for delivering fluid to the combustion chamber without passing said fluid through said pocket, and separate means in said combustion chamber for causing ignition in said combustion chamber.

45. In a fuel induction system for an internal combustion engine, the combination of an induction passage having means causing fluid to circulate circumferentially in the induction passage, said means including an offset portion adjacent the outlet of said passage.

46. In a fuel induction system for an internal combustion engine, the combination of an induction passage, and means adjacent the outlet of the induction passage for causing fluid to circulate circumferentially in said passage.

47. In a fuel induction system for an internal combustion engine the combination of a valve controlled induction passage and means causing liquid to circulate circumferentially in the induction passage adjacent the outlet from said passage when said valve is closed.

48. In an internal combustion engine, the combination of a combustion chamber, a combustion chamber pocket, and means for causing combustion energy to emerge from said pocket and to cause the combustion chamber fluid content to circulate about the combustion chamber axis.

49. In an internal combustion engine, the combination of a combustion chamber, an offset combustion chamber pocket, and means for causing combustion energy to emerge from said pocket and circulate circumferentially of said combustion chamber.

50. In an internal combustion engine, means for directing the combustion wave circumferentially of the combustion chamber and for directing inflammable fluid ahead of the combustion wave and into contact with the inflamed fluid adjacent the point at which ignition occurred.

51. In an internal combustion engine, the combination of a combustion chamber having a pocket, a passage to deliver fluid to said combustion chamber through said pocket, another passage to deliver fluid to said combustion chamber, separate means to govern the quantity and quality of fluid delivered through each of said passages, and a mechanically operated inlet valve at the outlet of each of said passages.

52. In an internal combustion engine, the combination of a combustion chamber with dual fluid inlets, separate means to regulate the quantity of fluid fed to said combustion chamber through each of said inlets, separate means to control the character of fluid fed to said combustion chamber through each of said inlets, and valves at said combustion chamber inlets to accomplish the delivery of fluid to said combustion chamber, said valves being positively operated and timed to open and to close in conformity to the fuel intake cycle but independently of the intake suction.

53. In an internal combustion engine, the combination of a combustion chamber, a plurality of fuel inlets leading to said combustion chamber, individual means to regulate the quantity of fuel fed through said inlets and a plurality of means for igniting fuel in said combustion chamber.

54. In an internal combustion engine, the combination of means for introducing fluid to the combustion chamber, means for igniting said fluid and means for circulating the combustion chamber fluid content during the impulse cycle to thereby cause unignited fluid to be driven onto the burning fluid toward said igniting means and igniting means located in spaced relation to said first mentioned igniting means to ignite that fluid adjacent said second mentioned ignition means.

55. In an internal combustion engine, the combination of a combustion chamber with a tangentially disposed combustion chamber pocket provided with an exhaust valve, and means for delivering fluid to said combustion chamber without passing said fluid through said pocket.

56. In an internal combustion engine, the combination of a combustion chamber with a tangentially disposed combustion chamber pocket provided with means for ignition, and means for delivering fluid to said combustion chamber without passing said fluid through said pocket.

57. In an internal combustion engine, the combination of a combustion chamber, with a tangentially disposed combustion chamber pocket provided with an exhaust valve, and means for ignition in said combustion chamber.

58. In an internal combustion engine the combination of a combustion chamber with a tangentially disposed combustion chamber pocket, and separate means for ignition in said combustion chamber and in said pocket.

59. In an internal combustion engine, the combination of a combustion chamber with a tangentially disposed combustion chamber pocket provided with an exhaust valve and means for ignition, and means for delivering fluid to said combustion chamber without passing said fluid through said pocket.

60. In an internal combustion engine, the combination of a combustion chamber with a tangentially disposed combustion chamber pocket provided with an inlet valve and an exhaust valve, and means for ignition in said combustion chamber.

61. In an internal combustion engine, the combination of a combustion chamber with a tangentially disposed combustion chamber pocket provided with an exhaust valve, means for delivering fluid to said combustion chamber without passing said fluid through said pocket, and means for ignition in said combustion chamber.

62. In an internal combustion engine, the combination of a combustion chamber with a tangentially disposed combustion chamber pocket provided with an inlet valve and an exhaust valve, and separate means for ignition in said combustion chamber and in said pocket.

63. An internal combustion engine having a combustion chamber with a tangentially disposed combustion chamber pocket provided with an exhaust valve and means for ignition, and separate means for delivering fluid to said combustion chamber and to said pocket.

64. An internal combustion engine having a combustion chamber with a tangentially disposed combustion chamber pocket provided with means for ignition, and separate means for delivering fluid to said combustion chamber and to said pocket.

65. An internal combustion engine having a combustion chamber with a tangentially disposed combustion chamber pocket provided with an exhaust valve, and separate means for delivering fluid to said combustion chamber and to said pocket.

66. An internal combustion engine having a combustion chamber with a tangentially disposed combustion chamber pocket provided with an inlet valve, and separate means for ignition in said combustion chamber and in said pocket.

67. An internal combustion engine having a combustion chamber with a tangentially disposed combustion chamber pocket, means for delivering fluid to said combustion chamber without passing said fluid through said pocket, and separate means for ignition in said combustion chamber and in said pocket.

68. An internal combustion engine having a combustion chamber with a tangentially disposed combustion chamber pocket provided with an exhaust valve, and separate means for ignition in said combustion chamber and in said pocket.

69. An internal combustion engine having a combustion chamber with a tangentially disposed combustion chamber pocket, separate means for delivering fluid to said combustion chamber and to said pocket, and separate means for ignition in said chamber and in said pocket.

70. An internal combustion engine having a combustion chamber with a tangentially disposed combustion chamber pocket provided with an exhaust valve, separate means for delivering fluid to said chamber and to said pocket, and means for ignition in said combustion chamber.

71. An internal combustion engine having a combustion chamber with a tangentially disposed combustion chamber pocket provided with an exhaust valve, means for delivering fluid to said chamber without passing said fluid through said pocket, and separate means for ignition in said chamber and in said pocket.

72. An internal combustion engine having a combustion chamber with a tangentially disposed combustion chamber pocket provided with an exhaust valve, separate means for delivering fluid to said chamber and to said pocket, and separate means for ignition in said chamber and in said pocket.

73. In an internal combustion engine, the combination of a combustion chamber, and a pocket forming a part of the combustion chamber, an exhaust valve provided in said pocket, means whereby fluid may be directly supplied to said combustion chamber, means whereby fluid may be directly supplied to said pocket and separate means for ignition provided in said pocket and combustion chamber.

74. In an internal combustion engine, the combination of a combustion chamber, a pocket forming a part of the combustion chamber, a fluid inlet leading to said pocket, a fluid inlet leading to said combustion chamber, and separate means whereby fluid may be ignited in said pocket and in said combustion chamber.

75. In an internal combustion engine, the combination of a combustion chamber, a plurality of fluid inlet passages each leading to said combustion chamber, and means whereby fluid may be introduced to said combustion chamber through either one or all of said passages and a plurality of separate means for igniting the fluid introduced through said passages.

76. In an internal combustion engine, the combination of a combustion chamber, a plurality of carburetors, separately operable individual throttles for charges delivered by said carburetors to said combustion chamber, individual fuel induction passages connecting said carburetors to said combustion chamber, valves between said passages and said combustion chamber, and means for igniting fluid in said combustion chamber, said valves being positively operated to open and to close in conformity to the fuel intake cycle but independently of the intake suction.

77. In an internal combustion engine, the combination of a combustion chamber, a combustion chamber pocket, means for supplying fluid, capable of rapid inflammation and combustion to said pocket, means for supplying fluid which burns less rapidly than the first mentioned fluid to said combustion chamber, and means for igniting the fluid in said pocket, said first and second mentioned means including separate fluid inlet passages to said pocket and to said combustion chamber, separate controls for quantity and quality of fluid fed through said passages and separate valves at the outlet of said passages, said valves being positively operated to open and close in conformity to the fuel intake cycle, but independently of the intake suction.

78. In an internal combustion engine, the combination of a combustion chamber, means providing for the combustion of fluid in said combustion chamber, and means causing the energy wave generated by said combustion to circulate circumferentially of the combustion chamber.

79. In an internal combustion engine, the combination of a combustion chamber, means providing for the combustion of fluid in said combustion chamber, a pocket in which said fluid is ignited, the combustion created in said pocket producing an energy wave and means for directing the energy wave into a whirling motion circumferentially of said combustion chamber.

80. In an internal combustion engine, the combination of a combustion chamber and means providing for the production of a combustion wave in a whirling motion circumferentially of said combustion chamber.

81. A device having means for causing the working fluid to be directed into a circular motion within an internal combustion engine, said circular motion occurring circumferentially of the combustion chamber and forcing unignited fluid onto burning fluid.

In witness whereof, I hereunto subscribe my name this 19th day of August A. D., 1921.

HOMER A. TRUSSELL.